US012542761B2

(12) United States Patent
Zacks et al.

(10) Patent No.: US 12,542,761 B2
(45) Date of Patent: Feb. 3, 2026

(54) PREDICTIVE POLICY ENFORCEMENT USING ENCAPSULATED METADATA

(71) Applicant: Cisco Technology, Inc., San Jose, CA (US)

(72) Inventors: David John Zacks, Vancouver (CA); Dmitry Goloubev, Waterloo (BE); Zizhen Gao, San Ramon, CA (US); Carlos M. Pignataro, Cary, NC (US); Nagendra Kumar Nainar, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 639 days.

(21) Appl. No.: 17/557,865

(22) Filed: Dec. 21, 2021

(65) Prior Publication Data
US 2023/0198946 A1    Jun. 22, 2023

(51) Int. Cl.
*H04L 9/40* (2022.01)

(52) U.S. Cl.
CPC ...... *H04L 63/0236* (2013.01); *H04L 63/0245* (2013.01); *H04L 63/029* (2013.01); *H04L 63/20* (2013.01)

(58) Field of Classification Search
CPC ..... H04L 63/20; H04L 63/02; H04L 63/0227; H04L 63/0245; H04L 63/0236; H04L 63/029
See application file for complete search history.

(56) References Cited

U.S. PATENT DOCUMENTS

| 8,159,941 | B2 * | 4/2012 | Dolganow | H04L 67/306 370/473 |
| 8,160,579 | B1 * | 4/2012 | Rosenberg | G06Q 20/102 709/227 |
| 8,838,820 | B2 * | 9/2014 | Eidelman | H04L 41/5083 709/224 |
| 9,825,856 | B2 * | 11/2017 | Yong | H04L 45/74 |
| 10,348,648 | B2 * | 7/2019 | Pignataro | H04L 45/566 |

(Continued)

OTHER PUBLICATIONS

Maino, et al., "Generic Protocol Extension for VXLAN (VXLAN-GPE)," draft-ietf-nvo3-vxlan-gpe-12, Internet Engineering Task Force (IETF), Network Working Group, Internet-Draft, Sep. 22, 2021, 22 pages.

*Primary Examiner* — Zachary A. Davis
(74) *Attorney, Agent, or Firm* — Edell, Shapiro & Finnan, LLC

(57) ABSTRACT

Methods are provided for predictive policy enforcement using encapsulated metadata. The methods involve obtaining a packet of an encapsulated traffic flow that is transported in a software-defined wide area network (SD-WAN) or in a cloud network. The packet includes a network virtualization tunneling header with an appended service plane protocol header and a payload. The methods further involve extracting, from the appended service plane protocol header, without performing deep packet inspection, enriched metadata that includes fields for one or more attributes related to a source of the packet or a destination of the packet, determining at least one network policy based on the enriched metadata, and applying, to the packet, the at least one network policy that relates to gathering analytics and/or transporting the encapsulated traffic flow to the destination.

20 Claims, 5 Drawing Sheets

(56) References Cited

U.S. PATENT DOCUMENTS

| | | | |
|---|---|---|---|
| 10,541,985 B2* | 1/2020 | Arunachalam | H04L 69/324 |
| 10,887,230 B2* | 1/2021 | Pignataro | H04L 45/304 |
| 10,938,685 B2* | 3/2021 | Indiresan | H04L 43/045 |
| 11,153,190 B1* | 10/2021 | Mahajan | H04L 67/148 |
| 11,924,489 B2* | 3/2024 | Grace | H04N 21/25891 |
| 2015/0081863 A1* | 3/2015 | Garg | H04L 41/00 |
| | | | 709/223 |
| 2015/0281089 A1 | 10/2015 | Marchetti | |
| 2016/0248685 A1 | 8/2016 | Pignataro et al. | |
| 2020/0036610 A1 | 1/2020 | Indiresan et al. | |
| 2020/0119941 A1* | 4/2020 | Chen | H04L 61/00 |
| 2020/0220793 A1* | 7/2020 | Hira | H04L 43/065 |
| 2021/0029087 A1 | 1/2021 | Uy et al. | |
| 2022/0210232 A1* | 6/2022 | Chen | H04L 41/40 |
| 2022/0353190 A1* | 11/2022 | Ramaswamy | H04L 12/4645 |
| 2024/0106748 A1* | 3/2024 | Zhang | H04L 45/741 |

\* cited by examiner

PREDICTIVE POLICY ENFORCEMENT USING ENCAPSULATED METADATA

TECHNICAL FIELD

The present disclosure relates to computer networking.

BACKGROUND

Edge nodes within a network or networks may establish an Internet Protocol (IP) tunnel or an IP network communications channel that uses various encapsulation protocols for the transport of traffic flows. Examples of these encapsulation protocols include Virtual Extensible Local Area Network (VxLAN) protocol, IPv4-to-IPv6 protocol, and IP Security (IPSec) protocol. VxLAN protocol is an encapsulation protocol for running an overlay network on an existing infrastructure (e.g., Layer-3 infrastructure). VxLAN defines an encapsulation format that encapsulates Ethernet™ frames in an outer User datagram protocol (UDP)/IP transport. The encapsulation format includes a payload for the traffic and a header for the control information. The edge nodes have the option to perform deep inspection (DPI) of transit traffic flows to obtain some information about the flow and may, optionally, perform some basic policy enforcement. For example, a software defined wide area network (SD-WAN) router or cloud-based virtual router instance may provide network based application recognition (NBAR) 2 services for application level visibility.

DESCRIPTION OF EXAMPLE EMBODIMENTS

Overview

Figure 1:
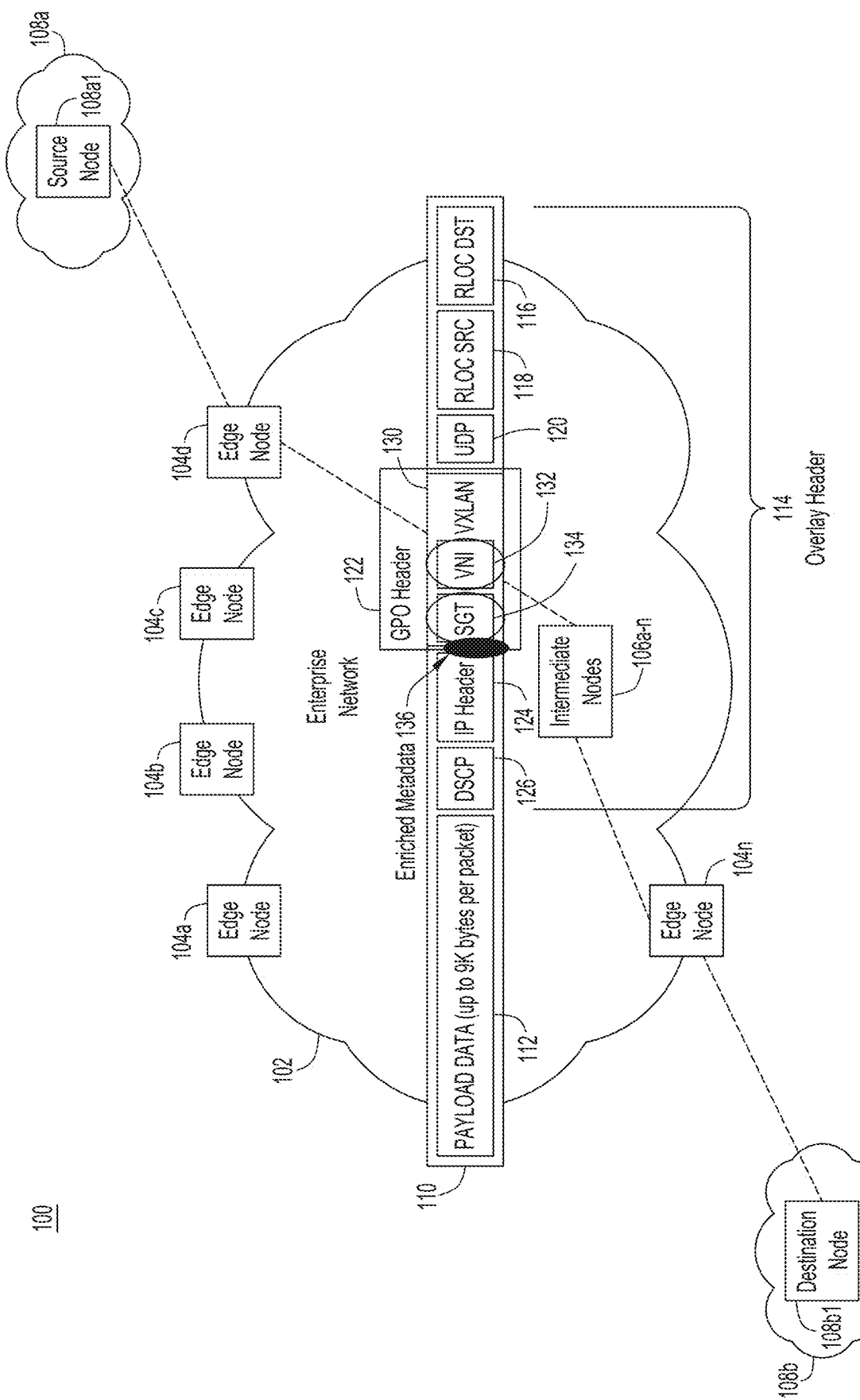
FIG. 1 is a diagram illustrating a system in which an encapsulated packet with enriched metadata traverses from a source network node to a destination network node, according to an example embodiment.

Briefly, methods are presented for predictive policy enforcement for intermediate network nodes based on encapsulated rich metadata.

In these methods, a computing device (such as an intermediate node) obtains a packet of an encapsulated traffic flow that is transported in a software-defined wide area network (SD-WAN) or in a cloud network. The packet includes a network virtualization tunneling header with an appended service plane protocol header and a payload. The computing device extracts, from the appended service plane protocol header, without performing deep packet inspection, enriched metadata that includes fields for one or more attributes related to a source of the packet or a destination of the packet, determines at least one network policy based on the enriched metadata, and applies, to the packet, the at least one network policy that relates to gathering analytics and/or transporting the encapsulated traffic flow to the destination.

EXAMPLE EMBODIMENTS

Edge nodes within a network have the option to perform DPI of transit application flows to provide visibility and optional policy enforcement. Typically, only the edge nodes can perform the DPI because they have a lower bandwidth and/or have less nodes connected to them. DPI is not performed by the mid-span or intermediate nodes because these mid-span nodes have a higher-throughput in the end-to-end transit path. Providing visibility and/or enforcement only at such edge network nodes is often sub-optimal. Further, many edge nodes can exist, leading to significant scaling challenges and a lack of overall visibility of aggregated flows due to the highly distributed nature of edge device placement and use across many sites and cloud locales.

Edge nodes are not able to share the knowledge gained from the DPI with other network nodes (mid-span nodes) because of a lack of space within the traditional IPv4/IPv6/SD-WAN/VXLAN packet header structure for storage and transport. Consequently, results of this DPI performed by the edge node cannot be shared or used by the other network nodes. In particular, the other network nodes within the traffic path cannot recognize and act upon the intelligence derived from this deep edge traffic inspection (DPI at the edge).

As an example, an edge WAN router may inspect the transit traffic and detect video, audio, and data flows but lacks a mechanism to signal the presence of such flows to any other transit network nodes (intermediate network nodes). The edge WAN router may, at most, be able to mark or re-mark Differentiated Services Code Point (DSCP) values for the traffic flow based on the DPI. Due to the limited space within the DSCP field (six bits) and the fact that applications share a common set of DSCP values, only very limited visibility and policy enforcement is possible at any other transit network nodes for the traffic. The edge WAN router may provide only limited visibility. Predictive policy models cannot be provided with sufficient information to make practical traffic decisions on the intermediate nodes in the end-to-end path.

In one or more example embodiment, the techniques provide an extended packet header that includes metadata reflective of the encapsulated traffic flow. This enriched metadata is generated by leveraging information learned from the DPI and other sources of data available at the edge network node (e.g., policies pushed down to the edge network nodes from a central network controller). The DPI may include, but is not limited to, using NBAR2 and application visibility and control (AVC). The packets may be marked with extended packet header carrying this rich set of metadata reflective of the encapsulated traffic flow. That is, this rich metadata is marked into and carried along with every packet in a traffic flow from the edge node along the network, thereby allowing other transit-path network nodes to gain detailed knowledge of the transiting network traffic flow without performing the DPI themselves, which is often impossible on these higher-throughput network devices. The techniques presented herein provide deep visibility into network traffic flows for the transit network nodes (intermediate network nodes), and enable associated and predictive policy enforcement actions based on this visibility, for use with SD-WAN and Cloud (as well as other) deployment models. Network traffic observability is significantly enhanced and analytics use cases may be enabled in an enterprise cloud portal. Further, these network nodes, in conjunction with a centralized controller, form a closed-loop control system embodying predictive analytical capabilities with automated response controls.

The techniques present a combination of the use of specific capabilities in the headers along with on-device policy enforcement and centralized telemetry analysis for determining the presence of out-of-profile traffic conditions and associated anomalies based on embedded header metadata, and the use of the observability to pursue predictive use cases and outcomes.

FIG. 1 is a block diagram depicting a system 100 in which an encapsulated packet with enriched metadata traverses from a source network node to a destination network node, according to an example embodiment. The system 100 includes an enterprise network 102 with edge nodes 104a-n and intermediate nodes 106a-n. The system 100 further includes a source node 108a1 that may be deployed in a cloud network 108a and a destination node 108b1 that may be deployed in a destination network 108b. An encapsulated packet or network packet 110 traverses from the source node 108a1 to the destination node 108b1 via various network nodes (the edge nodes 104a, 104b, 104c, 104d, and 104n and the intermediate nodes 106a-n).

The notation "a-n" denotes that a number is not limited, can vary widely, and depends on a particular use case scenario. The system 100 may vary widely in a number and types of entities and networks.

In various example embodiments, the entities of the system 100 (the edge nodes 104a-n, the intermediate nodes 106a-n, the source node 108a1, and the destination node 108b1) may each include a network interface, at least one processor, and a memory. The network interface may include one or more network interface cards that enable components of the entity to send and receive data over the one or more networks. Each entity may include internal and external hardware components such as those depicted and described in further detail in FIG. 5. The entities are nodes, collection points, network devices, computing devices, etc. These terms may be used interchangeably through the description. Each entity may be any programmable electronic device capable of executing computer readable program instructions. The entities may include line cards or stand-alone instances of one or more of switches, routers, gateways, repeaters, access points, traffic classifiers, firewalls, intrusion detectors, and the like. The entities may be configured to transport data traffic to and from various user devices and/or servers. The entities may include virtual devices such as a virtual switch or a virtual router. The entities may form secure tunnels to transport encapsulated traffic flow from one device to the next. In one example embodiment, one or more entities of the system 100 may be deployed in a cloud with its functionality distributed over a number of hardware devices. For example, the intermediate network nodes 106a-n may be virtual mid-span router instances.

The entities of the system 100 communicate via one or more networks such as the enterprise network 102, the cloud network 108a, and the destination network 108b. The networks may include a local area network (LAN), a wide area network (WAN) such as the Internet, or a combination thereof, and includes wired, wireless, or fiber optic connections. In general, the networks can use any combination of connections and protocols that support communications between the entities of the system 100.

In the system 100, the source node 108a1 generates a traffic flow that includes the network packet 110. The source node 108a1 may be a user device, used by a user, to access a web application, for example. The interaction with the web application generates a traffic flow that includes a number of network packets such as the network packet 110. The network packet 110 traverses the enterprise network 102 to arrive at the destination node 108b1 (which may be within the enterprise network 102). The network packet 110 is encapsulated in an overlay fabric, such as a VxLAN fabric.

The network packet 110 includes a payload data 112 and an overlay header 114. The overlay header 114 may be a VxLAN group policy object (GPO) header. The overlay header 114 includes a tunnel destination resource locator (RLOC Dest 116), a tunnel source resource locator (RLOC SRC 118), a UDP encapsulation header 120, a GPO header 122, an IP header 124, and a DSCP field 126.

The GPO header 122 includes a VxLAN portion 130, a virtual network ID (VNI) 132, and a scalable group tag (SGT) 134. The VNI 132 and the SGT 134 are examples of metadata included in the network packet 110. The VNI 132 designates a routing table to use in transporting the network packet 110 in an overlay network and is, for example, a 24-bit identifier. The SGT 134 designates a policy group associated with the traffic flow and is a 16-bit identifier. The VNI 132 and the SGT 134 are useful for driving network segmentation use cases.

In an example embodiment, the network packet 110 further includes enriched metadata 136, as detailed below with reference to FIG. 2. The enriched metadata 136 includes fields for one or more attributes related to a source of the packet and/or a destination of the packet. The edge nodes 104a-n receive various network packets of traffic flows and perform the DPI. The edge nodes 104a-n then append information learned from the DPI and other sources to network packets, such as the network packet 110, as enriched metadata 136.

The intermediate nodes 106a-n extract the enriched metadata 136 from the fields of the overlay header 114, determine one or more of predictive network policies to apply based on the enriched metadata 136, and apply the determined network policy. This enriched metadata 136 provides the intermediate nodes 106a-n with this additional capability that is especially relevant for, and is useful within, the SD-WAN and cloud-based deployments, as these typically include mid-span network nodes that lack granular visibility (DPI capability), granular policy control and/or enforcement capabilities.

The enriched metadata 136 is useful for SD-WAN and cloud deployments that have mid-span technologies between data sources and sinks, and already include a level of data header encapsulation (the overlay header 114) that allows for the insertion, transport, and use of additional metadata headers and wrappers to apply predictive network policies at the intermediate nodes 106a-n. The enriched metadata 136 may then be stripped (removed) before passing the network packet 110 along to its ultimate destination (e.g., the destination node 108b1). The enriched metadata 136 allows for enhanced visibility, powerful analysis, and predictive outcomes, in the mid-span portion of the enterprise network 102. This mid-span network portion encompasses (but is not limited to) the edge nodes 104a-n and the intermediate nodes 106a-n such as routers, switches, and other network nodes of an enterprise that may be located at an edge, aggregation, and core sites, as well as any such data which the enterprise may choose to share with their transport partner network providers and vendors to drive enhanced outcomes.

Figure 2:
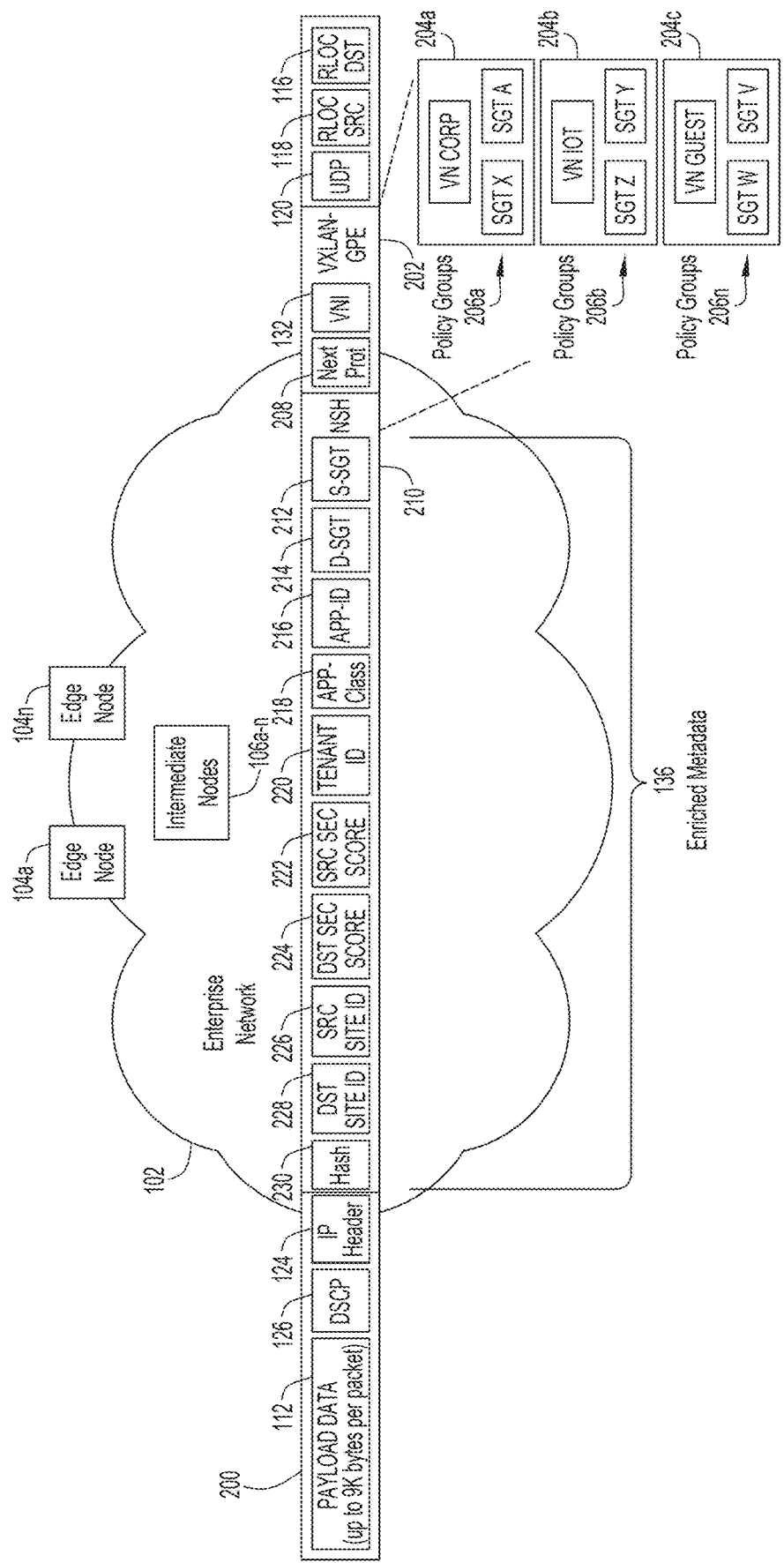
FIG. 2 is a diagram illustrating a structure of a packet in which a network virtualization header has an appended service plane protocol header that includes enriched metadata, according to an example embodiment.

With continued reference to FIG. 1, FIG. 2 is a diagram illustrating a packet 200 that has a network virtualization header appended with a service plane protocol header which includes enriched metadata therein, according to an example embodiment.

The packet 200 includes an extended VxLAN (VXLAN-GPE) field 202 that allows for additional one or more headers being chained thereto. The VNI 132 designates a routing table to use in transporting the packet 200 in an overlay network and may be a 24-bit identifier, as explained above with reference to FIG. 1. The VNI 132 defines various overlay networks such as an enterprise virtual network (VN Corp.) 204a, a virtual network (VN) for Internet of Things (IoT) 204b, and/or a VN guest 204c. Each overlay network is associated with one or more policy groups 206a-n defined using the SGT 134 such as the policy group 206a, 206b, and 206n. For example, the SGT A to SGT X are associated with the VN Corp. 204a, the SGT Y to the SGT Z are associated with VN IoT 204b, and SGT V to SGT W are associated with the VN guest 204c.

The packet 200 further includes the payload data 112 that carries various data of the packet 200 such as multimedia data of a conferencing session. For example, a typical payload may include up to 9K bytes of data.

A next protocol (prot) field 208 allows for chaining of other headers for various overlay networks. The next prot field 208 indicates that another header is chained, such as a network service header (NSH) 210. The NSH 210 is a non-limiting example of the appended service plane protocol header, and includes one or more attributes related to a source of the packet 200 and/or a destination of the packet 200 i.e., the enriched metadata 136.

In one or more example embodiments, to accomplish granular metadata transport, inspection, and associated control on high-speed, mid-span nodes (the intermediate nodes 106a-n), transport and use of the enriched metadata 136 in the data plane is employed. The metadata wrapper for transport and use is, for example, the extended VxLAN header combined with the NSH 210 of a fixed length type (Type 1), which is 128-bits long. While the NSH 210 may be of a variable length (Type 2) or other appended service plane protocol headers may be used, using the NSH 210 of Type 1 is particularly advantageous in that it allows the enriched metadata 136 to be inserted at known-in-advance, pre-defined, or predetermined bit positions for easy and quick retrieval. That is, these fixed or pre-defined bit positions for the enriched metadata 136 are particularly useful for exacting and using by the mid-span, high-speed network devices, some of which cannot quickly parse complex, variable-length metadata headers in which the data are at variable positions within the frame. Embedding the enriched metadata 136 in pre-defined or fixed bit positions provides for easy and quick extraction and use of the information embedded therein. Further, the relatively short length of the NSH 210 (128 bits) provides for fast hardware processing.

In one alternative example embodiment, other wrappers for the enriched metadata 136 may be used that are of a fixed-length nature and sufficiently short (typically contained within the first 128 bits of the frame) so that they can be processed by a programmable Application Specific Integrated Circuit (ASIC) packet processing engine on both the edge nodes 104a-n and the intermediate nodes 106a-n that are involved in transmitting the traffic flow. Encapsulation of the enriched metadata 136 could be via various different wrapper types. Fixed packet headers such as the NSH 210 have the advantage of being more easily indexed and processed in ASIC-based implementations, common in the transit network path in large and higher-performance network deployments.

In one or more example embodiments, the enriched metadata 136 may include a wide variety of information for quality of service (QoS) policies, path selection policies, predictive policies, policy enforcements, segmentation, data sovereignty, analytics, telemetry operations, etc. The enriched metadata 136 may include enterprise related information, user or user group related information, user device related information, etc. For example, the enriched metadata 136 may be used to gain insight into the traffic flow at mid-span portions of the enterprise network 102, to dynamically modify enforcement policies (predictive policies), and to improve telemetry operations. The edge nodes 104a-n and the intermediate nodes 106a-n in conjunction with a centralized controller form a closed-loop control system with predictive analytical capabilities and automated response controls based on the enriched metadata 136 embedded in one or more packets of the network traffic flow.

Some non-limiting examples of the enriched metadata 136 include source group tag (S-SGT) 212, destination group tag (D-SGT) 214, application (app) identifier (ID) 216, app class 218, tenant ID 220, a source (src) security (sec) score 222, a destination (dst) sec score 224, src site ID 226, dst site ID 228, and a secure hash (hash) 230. The enriched metadata 136 may include additional and/or other fields and/or other attributes. For example, the attributes may provide QoS related information, user related information, network related information, etc.

Each of the S-SGT 212 and the D-SGT 214 may be encapsulated into a fixed position within the NSH 210 and each may have a fixed length of 16 bits. The S-SGT 212 and the D-SGT 214 are attributes that identify a group to which the respective network node belongs. Based on the S-SGT 212 and the D-SGT 214 or the D-SGT 214 alone, the intermediate nodes 106a-n may apply policies specific to the destination group. These policies may be helpful for QoS and other use cases, which need to classify source and destination traffic, and handle traffic at an ingress of the enterprise network 102 and/or mid-span of the enterprise network 102. By including both the S-SGT 212 and the D-SGT 214, it is possible to enforce policies at the ingress of the enterprise network 102 and/or the mid-span of the enterprise network 102 as opposed to only at an egress of the enterprise network 102 when the S-SGT 212 alone is included.

The app ID 216 and the app class 218 are attributes that define an application that generated the data being transmitted in the packet 200. The app ID 216 and the app class 218 may be determined at one of the edge nodes 104a-n by performing deep packet inspection, such as NBAR2. The app ID 216 may be 16-bits in length and the app class 218 may be 8-bits in length.

The app ID 216 may granularly identify a specific application, such as a video conferencing application, a voice conferencing application, etc. and the app class 218 may identify an application type such as a conferencing application type, etc. Using the app ID 216 and/or the app class 218, the intermediate nodes 106a-n may apply policies in the data plane based on the granular application or the application class superset.

The app ID 216 and the app class 218 may be particularly useful for path selection policies, QoS policies, and analytics. In one example embodiment, derailed enumeration of the application involved and the class to which it belongs are used as a classifier for appropriate traffic handling (path selection, encryption, QoS, etc.) at any point in a network path (ingress, mid-span, egress) without reclassification. The intermediate nodes 106a-n provide visibility to any given application and/or application group such as how much network flow traffic of this type was handled. Additionally, the intermediate nodes 106a-n may execute policy-based control based on the app ID 216 and/or the app class 218 such as send all videoconferencing traffic over a network link A and not a network link B, etc. The app ID 216 and the app class 218 are identifiers carried in a data plane as part of the enriched metadata 136.

The tenant ID 220 is a unique metadata identifier of a specific network tenant in a multi-tenant network environment. The tenant ID 220 may be 12-bits in length. The tenant ID 220 may be a master classifier or a superset classifier for some of the tenant specific policy applications at the edge nodes 104a-n and/or the intermediate nodes 106a-n involved in transmitting the packet 200. The tenant ID 220 allows for policies to be tied to a particular network tenant as an overarching construct, subsuming other identifiers (such as the VNI 132, the SGT 134, etc.), which may overlap between various network tenants. The tenant-ID 220 is thus useful because it allows for VNI/SGT overlap between various network tenants. The tenant-ID 220 is further useful because it allows for applying tenant specific policies at a higher level, in an aggregation, regardless of a subnet, etc. The intermediate nodes 106a-n may use the tenant ID 220 for network segmentation related policies.

The src sec score 222 and the dst sec score 224 identify the trustworthiness of the respective node. The src sec score 222 is a security score assigned to the source node 108a1 and the dst sec score 224 is a security score assigned to the destination node 108b1. The src sec score 222 and the dst sec score 224 may each be 2-bits in length. The src sec score 222 and the dst sec score 224 allow for policies based on explicit data plane identification of the trustworthiness of the source and destination (the sink node). This detailed and granular security score, for both (the source and the destination), may be used as a classifier for appropriate traffic handling (path selection, redirection, encryption, ERSPAN copy, filtering, etc.) at any point in the enterprise network 102 without reclassification. In one example embodiment, based on the src sec score 222 and/or the dst sec score 224 in the data plane, the intermediate nodes 106a-n may direct the packet 200 (the traffic flow) to a firewall or further security inspection.

In one example embodiment, different security scores may be assigned per traffic flow and/or per traffic microflow such that a single user device can be associated with multiple different security postures simultaneously, depending on (for example) what applications are in use and/or the destinations to with which these applications are communicating. Security scores can be assigned by a security control plane (e.g., Identity Services Engine (ISE)™, Stealthwatch™, etc.) or obtained from another external entity, and supplied to an edge node as needed by the control plane. In one example, the edge device may derive the security score itself via appropriate posture assessment and flow or microflow analysis.

The src site ID 226 and the dst site ID 228 are identifiers that identify physical location of a respective entity. For example, the src site ID 226 identifies the physical site of the source node 108a1 and the dst site ID 228 identifies the physical site of the destination node 108b1. The src site ID 226 and the dst site ID 228 may each be 10-bits in length. The edge nodes 104a-n at an ingress may perform a lookup operation to determine a geographic location (country, region, etc.) of the source and/or the destination and incorporate this information as the src site ID 226 and the dst site ID 228.

The src site ID 226 and the dst site ID 228 allow for policies based on explicit identification of the physical sites, carried in the data plane, and distinguishable for policy application on the intermediate nodes 106a-n. Based on the src site ID 226 and the dst site ID 228, the intermediate nodes 106a-n are able to distinguish where the traffic originated from and/or is destined to, physically carried within the data plane. For example, the src site ID 226 and the dst site ID 228 may be used as a classifier for appropriate traffic handling (path selection, redirection, encryption, filtering, etc.) at any point in the network path without reclassification. The src site ID 226 and the dst site ID 228 provide a level of physicality to the packet 200. In one or more example embodiment, based on the src site ID 226 and the dst site ID 228, the intermediate nodes 106a-n are configured to identify network traffic going to/from any specific country, region, or physical or virtual environment, and apply any number of corresponding policies as appropriate such as country-specific crypto policy, apply different policies to a user or device's traffic flow/handling when a user/device is in one country versus another country as source and/or destination, etc. (count, redirect, copy, etc.). For example, the telemetry policy may include counting a number of packets from a location A, redirecting packets from a location B to another link, etc.

In one example embodiment, the src site ID 226 and the dst site ID 228 identify site locations (source or destination) via an IP address mapping and/or access control list (ACL) matching to determine a geographic source location and/or a geographic destination location of the packet 200.

The hash 230 is used to validate or preserve integrity of the enriched metadata 136. The hash 230 may be 32-bits in length. Since the enriched metadata 136 may be used for policy application on the edge nodes 104a-n and the intermediate nodes 106a-n along the network path, each node may need to determine if the NSH 210 has been tampered with or altered in the transit. Therefore, an appropriate hashing function is used with the packet header metadata, and the hash 230 is carried as part of the enriched metadata 136 in the wrapper header itself in order to validate the integrity of the enriched metadata 136 by comprising a part of the local harsh with a portion of the secure hash value included in the enriched metadata 136.

In general, secure hashes (example: SHA-256) tend to be too long to be included in the fixed-length packet header. In one example embodiment, only the last <n> bits of a secure hash is included as the hash 230. The respective node computes an entire hash length locally and then, based on the enriched metadata 136 received in the packet 200, compares the last <n> bits of the locally computed hash (a part of the hash is compared) with a value of the hash 230 in order to determine the validity of the enriched metadata 136 (to accept the packet metadata as valid or alternatively to discard it as invalid). In other words, the hash 230 is used to validate integrity of the appended service plane protocol header. While this approach may reduce the security provided by the hash, given that hash functions use a waterfall algorithmic approach where a single bit changed in the input (i.e., the enriched metadata 136) produces (on average) a change of 50% of the bits in the hash output, taking the last <n> bits of the hash to compare, from the computed (much larger) hash, is a reasonable security trade-off because it would be difficult, if not impossible, for an attacker to manipulate the enriched metadata 136 to achieve the desired result, while still having a hash value that matches in the last <n> bits the original hash value. As such, the hash 230 may be the last 32 bits of a larger SGA-256 hash function. The requirements may be governed by the platforms involved and their capabilities for hash function computation, truncation, and comparison. In other words, the actual portion of the hash being used for the value of the hash 230 may vary depending on a particular deployment and use case scenario.

In one example embodiment, the enriched metadata 136 may include transit site IDs and security scores. That is, as the traffic flow is steered over transit sites (such as an Umbrella or other 3rd party as a service (aaS)), the enriched metadata 136 is augmented or a portion is overwritten with additional details that are used by other transit network devices that process it further.

These are just some examples of the information that may be included in the enriched metadata 136. The enriched metadata 136 may include other attributes and values depending on a particular use case scenario and network deployment.

Figure 3:
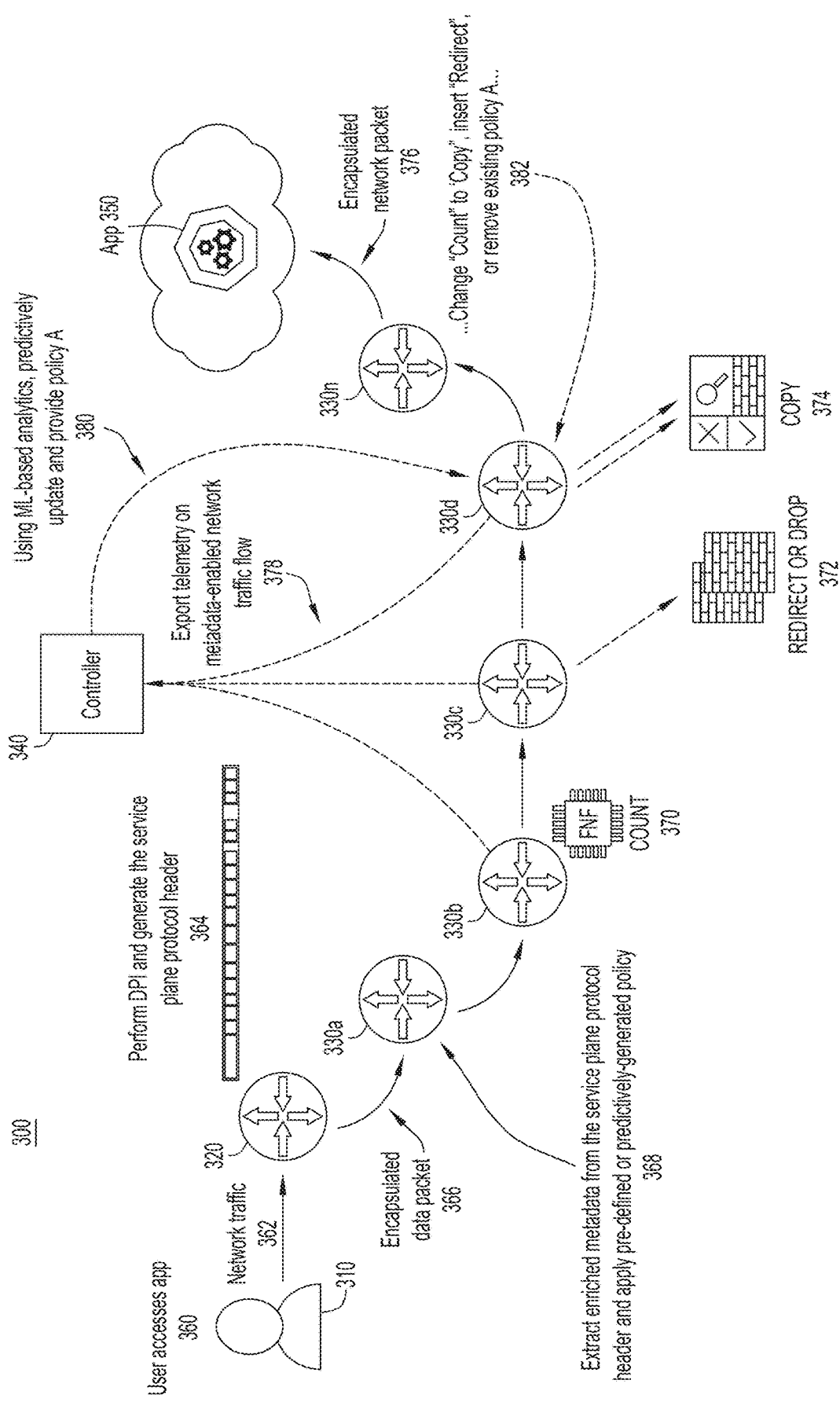
FIG. 3 is a flow diagram illustrating a method of performing, by an intermediate node, predictive telemetry operations based on enriched metadata in a header of an encapsulated packet, according to an example embodiment.

FIG. 3 is a flow diagram illustrating a method 300 of performing, by an intermediate node, predictive telemetry operations based on enriched metadata in a header of an encapsulated packet, according to an example embodiment. The method 300 involves a user device 310, an edge network node 320, intermediate nodes 330*a-n*, a controller 340, and a destination node 350.

The user device 310 may include any user equipment that is configured for interacting with a user such as a laptop, a personal computer, a smartphone, etc. The edge network node 320 may be an ingress or egress network device that is at an edge of one network for communicating with another network such as a first hop router or an SD WAN router. The intermediate nodes 330*a-n* are also network devices, such as mid-span routers or switches.

The controller 340 is a control unit that configures and controls the network devices, such as a SDN controller. The controller 340 may obtain for the edge network node and the intermediate nodes 330*a-n* (via export or direct device query) the metadata associated with any/all flows transiting that device, and based on analysis of this metadata, make future predictions about traffic flows (e.g., based on machine learning (ML)-based clustering or regression analysis). For example, the central controller could analyze the resulting metadata, granularly and in aggregate, and determine whether traffic for a given tenant is likely to exceed its monthly bandwidth cap, or whether the traffic volumes at any given granular security level were exceeding defined upper bounds that is to trigger a policy response. The controller 340 may be one or more predictive monitoring services that may proactively modify a policy or generate a new policy, based on the telemetry data.

The destination node 350 may include one or more servers that host one or more applications such as conferencing server configured to provide a conferencing service to the user.

At 360, a user, via the user device 310, accesses an application and generates a traffic flow that includes a number of network packets that have a network virtualization tunneling header and a payload.

At 362, the network traffic is received from the user device 310 by the edge network node 320. At 364, the edge network node 320 performs traffic analysis such as the DPI to obtain information about the network packet that includes a header and a payload. The edge network node 320 may gather information about the network packet based on the DPI or an external source (perform a lookup operation). The information may include one or more of source and destination related data, application type, physical locations, security scores, tenant identifier, etc. The edge network node 320 then generates a service plane protocol header that includes some or all of this information (enriched metadata) and appends or inserts the service plane protocol header to a network virtualization tunneling header.

At 366, the encapsulated data packet with the enriched metadata is transmitted from the edge network node 320 to one or more intermediate network nodes 330*a-n*. The intermediate network nodes 330*a-n* inspect the appended protocol header, extract the enriched metadata, and act according to one or more pre-defined or predictively generated policies based on the enriched metadata.

For example, the encapsulated data packet is received by the first intermediate network node 330*a*. At 368, the first intermediate network node 330*a* inspects the appended service plane protocol header, extracts the enriched metadata from the header, and then applies a pre-defined or predictively-generated policy based on the extracted information (the enriched metadata).

By way of another example, at 370, a second intermediate node 330*b* receives the encapsulated data packet, extracts enriched metadata from the header of the packet, and applies one or more telemetry related policies such as counting the number of network packets of different security levels, for different tenants, of different application types, etc. In other words, the second intermediate node 330*b* obtains telemetry data with respect to types and amount of traffic that crosses the second intermediate node 330*b* for a predetermined time interval.

By way of yet another example, at 372, a third intermediate node 330*c* receives the encapsulated data packet, extracts the enriched metadata from the header, and applies one or more security related policies, such as redirecting a packet to a firewall or a filtering device based on a security score of the packet or physical or geographic location of the source and/or destination, etc. In some instances, the third intermediate node 330*c* may drop the data packet based on the enriched metadata e.g., low security score. In other words, the third intermediate node 330*c* performs filtering of the network packets in the traffic flow based on the enriched metadata and without performing DPI or other type of traffic analysis.

In still another example, at 374, a fourth intermediate node 330*d* receives the encapsulated network packet, extracts enriched metadata from the header, and applies one or more security related policies such as copying a suspicious packet for further analysis based on security score, physical geo location of the source and/or destination, etc.

At 376, the encapsulated data packet continues to traverse in its network path, such as to a fifth intermediate node 330*n* until it reaches the destination node 350.

Additionally, at 378, one or more of the intermediate nodes 330*a-n* may export gathered telemetry on the metadata-enabled traffic flows to the controller 340 e.g., using the Flexible NetFlow™ technology, for example.

The controller 340 may include one or more predictive monitoring services that may proactively generate a new policy or modify an existing policy based on the telemetry. That is, using ML-based analysis, such as cluster analysis or regression, at 380, the controller 340 may predictively update an existing policy, generate a new policy, and distribute the policy to one or more of the network devices within the network (to any node along the network path) so that the policy (new or updated) is applied by the respective node. That is, the controller 340 may detect a predefined pattern or determine that a predetermined threshold has been reached, or dynamically learn thresholds via ML algorithms. Based on these patterns and/or thresholds, the controller 340 predictively updates existing policies, generates new polices, and/or distributes the policies to various nodes.

For example, at 382, the fourth intermediate node 330*d* receives a policy update instruction to change "count" the data packets to "copy" the data packets and a "redirect" to send the copied data packets for a monitoring service. As another example, the policy update instruction may request that the existing policy is deleted. As yet another example, the ML algorithm may determine that 50% more video conferencing traffic is traversing the fourth intermediate node 330*d*. Based on this determination, additional telemetry collectors may be turned on at the fourth intermediate node 330*d*, such as to copy video conferencing packets. The predictive polices are generated based on observed metadata, centralized ML-based traffic analysis, and an enterprise policy.

In one or more example embodiment, the controller 340 may use the control plane to instruct the edge network node 320 and/or the intermediate nodes 330*a-n* to introduce an appropriate traffic marking for the data packets and these markings may be included into the enriched metadata. The process may be dynamic and evolving based on the telemetry data gathered. By having the telemetry gathered by various edge nodes and the transit mid-span nodes provides a richer source of telemetry data on traffic types, paths, and functions in the network. With access to this rich metadata set, a mid-span node may determine one or more of: (1) quantity of data for any particular app or app-type that is crossing this node, (2) type of data that is crossing this node, (3) different security levels of various data, (4) granularity per flow/microflow and/or source/destination, (5) tenants that are using the network for which purposes and amount of data that they are generating, and/or (6) the sources and sinks of the network traffic, classified by, for example, granular site-IDs. Based on these various determinations, the mid-span node may apply one or more policies without any reclassifications or deep packet inspections.

Additionally, based on this rich metadata, the policies applied by the mid-span nodes may be dynamically generated (predictive policies). The mid-span nodes may gather telemetry by reporting the enriched metadata or portions thereof to a collector device (the controller 340) for analysis. The enriched metadata may be included in flow records and exported via Flexible NetFlow (FNF). One or more nodes may apply policies (on-device policy implementation) such as forwarding, dropping, counting, copying, redirecting the data packets, etc. based on any combination/permutation of embedded granular metadata. These on-device policies may be implemented on mid-span nodes with no native DPI capability.

Further, the rich metadata may trigger off-device metadata processing (or encapsulated on-device, via embedded software or containerized application use processing) for detecting anomalies or for predictive analysis. For predictive analysis, the controller obtains from the edge node and/or the mid-span node the metadata associated with any/all flows transiting that device, analyzes the gathered telemetry data, and generates predictions about traffic flows based on the analysis. For example, the controller may determine that the traffic volumes at any given granular security level exceeds a normal threshold. This, in turn, may trigger a policy response. This policy response includes, for example but not limited to, actions such as more granular traffic accounting, traffic redirection into security filtering or other adjunct network elements, traffic throttling, more optimal path selection for a subset of designated traffic flows, traffic drop, or other possible actions or outcomes, based on predictive analysis of current and possible future traffic behavior enabled by the deep visibility into the traffic streams provided by the embedded, enriched metadata.

In one or more example embodiments, the granular metadata, described above, is carried in the data plane and provides a policy application on one or more network nodes involved, and serves to supply the granular and specific metadata needed for a centralized policy application and use, predictive analysis and associated policy actions. A closed loop analysis system is thus generated using embedded, granular packet metadata that drives centralized policy predictions and responses.

In one or more example embodiments, standard packet header types are being used, similar to those used in SD-WAN and SD-Access. These techniques are therefore easy implement or integrate into existing network deployments. Moreover, the use of fixed-length packet header fields with well-known and defined-in advance bit positions is well-matched to the programmable ASIC hardware of various network devices, and for cloud-based deployments where central processing unit (CPU)-derived high-speed packet handlers (vector packet processing (VPP), etc.) are easily adapted to handle these fixed-length and predicable metadata header encapsulations.

The techniques presented herein, provide for the edge nodes in a network, marking within an extended packet headers, a rich set of metadata obtained based on the DPI and leveraging other sources of data available to them (such as policies pushed down to the edge nodes from a controller). Since this rich metadata set is marked into and carried along with every packet from the edge nodes, other transit-path network nodes gain rich, detailed knowledge of the transiting network traffic without performing DPI but by simply extracting this rich metadata set from network traffic packets. Additionally, these nodes, in conjunction with the controller, generate a closed-loop control system embodying predictive analytical capabilities with automated response controls.

Figure 4:
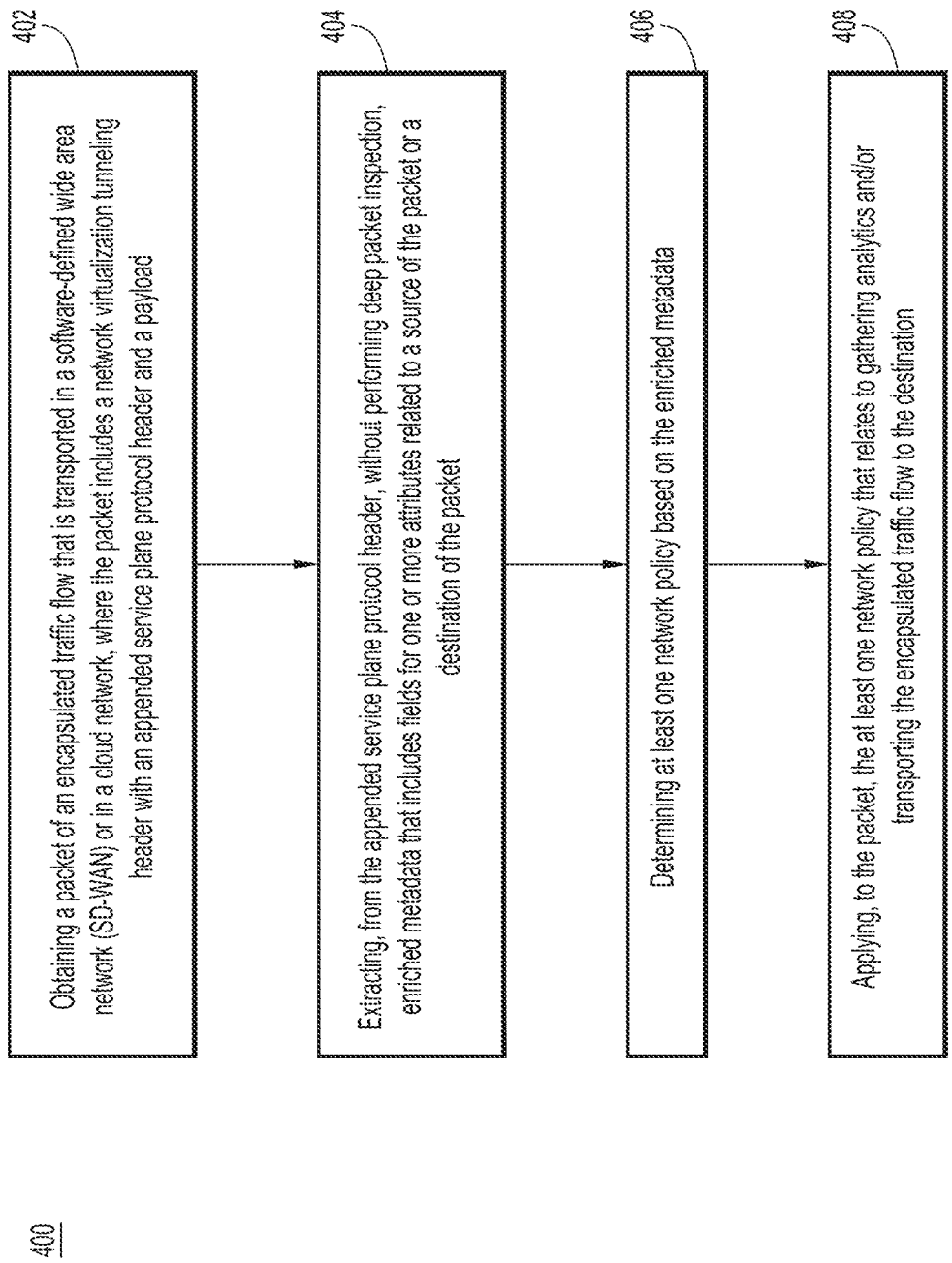
FIG. 4 is a flow diagram illustrating a method of applying, by an intermediate node, at least one network policy based on enriched metadata in a header of an encapsulated packet, according to an example embodiment.

FIG. 4 is a flow diagram illustrating a method 400 of applying at least one network policy based on encapsulated metadata, according to an example embodiment. The method 400 is performed by a computing device such as one of the intermediate nodes 106*a-n* of FIG. 1 and/or the intermediate nodes 330*a-n* of FIG. 3.

At 402, the method 400 involves obtaining a packet of an encapsulated traffic flow that is transported in a software-defined wide area network (SD-WAN) or in a cloud network. The packet includes a network virtualization tunneling header with an appended service plane protocol header and a payload.

At 404, the method 400 involves extracting, from the appended service plane protocol header, without performing deep packet inspection, enriched metadata that includes fields for one or more attributes related to a source of the packet or a destination of the packet.

At 406, the method 400 involves determining at least one network policy based on the enriched metadata.

At 408, the method 400 involves applying, to the packet, the at least one network policy that relates to gathering analytics and/or transporting the encapsulated traffic flow to the destination.

In one or more example embodiments, an edge network node may generate the enriched metadata by performing the deep packet inspection of the packet. The operation 404 of extracting the enriched metadata may include extracting the fields from one or more pre-defined bit positions of the appended service plane protocol header.

In one instance, the at least one network policy may include gathering telemetry. The method 400 may further involve providing, to a predictive monitoring service, at least a portion of the enriched metadata and obtaining, from the predictive monitoring service, a new network policy to be applied to the encapsulated traffic flow. The new network policy may be generated based on the portion of the enriched metadata.

In one form, the enriched metadata may include a first security score for the source and a second security score for the destination. The operation 404 of extracting the enriched metadata may include obtaining at least one of the first security score or the second security score, per packet flow or per packet microflow.

In another form, the enriched metadata may include a tenant identifier that identifies a network tenant. The operation 408 of applying the at least one network policy may then include applying a tenant specific policy to the packet.

In yet another form, the enriched metadata may include location identifiers. The operation 406 of applying the at least one network policy may then include applying a location specific policy to the packet.

According to one or more example embodiments, the enriched metadata may include a portion of a secure hash value computed at an edge network node. The method 400 may further involve computing a local hash and comparing a part of the local hash to the portion of the secure hash value included in the enriched metadata to validate integrity of the appended service plane protocol header.

In one instance, the method 400 may further involve providing, to an external entity, the enriched metadata for machine learning and/or regression analysis that generates a predictive policy for the encapsulated traffic flow and obtaining, from the external entity, the predictive policy to be applied to the encapsulated traffic flow.

According to one or more example embodiments, the fields for the one or more attributes may include an application identifier, location identifiers of a source physical location and a destination physical location, a destination group tag, a security score for one or more of the source of the packet or the destination of the packet, or a tenant identifier.

Figure 5:
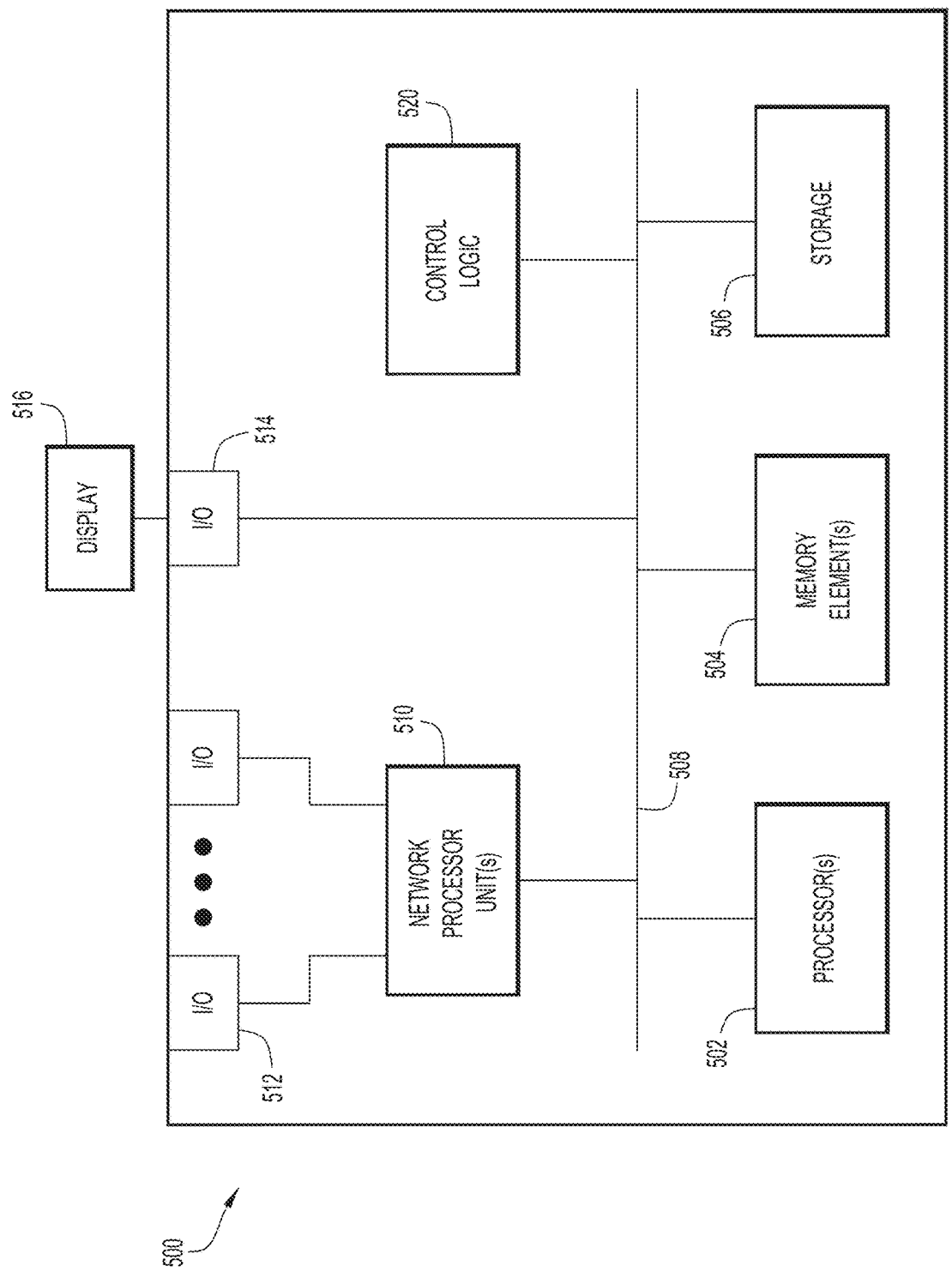
FIG. 5 is a hardware block diagram of a computing device that may perform functions associated with any combination of operations in connection with the techniques depicted and described in FIGS. 1-4, according to various example embodiments.

FIG. 5 is a hardware block diagram of a computing device 500 that may perform functions associated with any combination of operations in connection with the techniques depicted in FIGS. 1-4, according to various example embodiments, including, but not limited to, operations of any of the entities such as the edge nodes 104a-n, the intermediate nodes 106a-n, the source node 108a1, or the destination node 108b1 of FIG. 1 or the user device 310, the edge network node 320, the intermediate nodes 330a-n, the controller 340, or the destination node 350 of FIG. 3. It should be appreciated that FIG. 5 provides only an illustration of one embodiment and does not imply any limitations with regard to the environments in which different embodiments may be implemented. Many modifications to the depicted environment may be made.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, physical layer (PHY) of Open Systems Interconnection (OSI) model, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with one or more memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 516, a display screen, or the like.

In various embodiments, control logic 520 includes instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as one of the intermediate nodes 106*a-n* of FIG. 1 or the intermediate nodes 330*a-n* of FIG. 3. The apparatus includes a memory, a network interface configured to enable network communications and a processor. The processor is configured to perform operations which include obtaining a packet of an encapsulated traffic flow that is transported in a software-defined wide area network (SD-WAN) or in a cloud network. The packet includes a network virtualization tunneling header with an appended service plane protocol header and a payload. The operations further include extracting, from the appended service plane protocol header, without performing deep packet inspection, enriched metadata that includes fields for one or more attributes related to a source of the packet or a destination of the packet, determining at least one network policy based on the enriched metadata, and applying, to the packet, the at least one network policy that relates to gathering analytics and/or transporting the encapsulated traffic flow to the destination.

In yet another example embodiment, one or more non-transitory computer readable storage media encoded with instructions are provided. When the media is executed by a processor, the instructions cause the processor to execute a method which involves obtaining a packet of an encapsulated traffic flow that is transported in a software-defined wide area network (SD-WAN) or in a cloud network. The packet includes a network virtualization tunneling header with an appended service plane protocol header and a payload. The method further involves extracting, from the appended service plane protocol header, without performing deep packet inspection, enriched metadata that includes fields for one or more attributes related to a source of the packet or a destination of the packet, determining at least one network policy based on the enriched metadata, and applying, to the packet, the at least one network policy that relates to gathering analytics and/or transporting the encapsulated traffic flow to the destination.

In yet another example embodiment, a system is provided that includes the devices and operations explained above with reference to FIGS. 1-5.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory elements(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, Institute of Electrical and Electronics Engineers (IEEE) 802.11™ (e.g., Wi-Fi®/Wi-Fi6®), IEEE 802.16™ (e.g., Worldwide Interoperability for Microwave Access (WiMAX™)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by an intermediate network node, a packet of an encapsulated traffic flow that is transported in a software-defined wide area network (SD-WAN) or in a cloud network, the packet including a network virtualization tunneling header with an appended service plane protocol header and a payload;
extracting, by the intermediate network node, from one or more pre-defined bit positions of the appended service plane protocol header, without performing deep packet inspection at the intermediate network node, enriched metadata that includes fields for one or more attributes related to a source of the packet or a destination of the packet, wherein the enriched metadata was generated by an edge network node performing deep packet inspection of the packet and the enriched metadata was inserted by the edge network node in the one or more pre-defined bit positions in an overlay header between an Internet Protocol header and a group policy object header;
determining, by the intermediate network node, at least one network policy based on the enriched metadata, wherein the at least one network policy relates to at least one of gathering analytics or transporting the encapsulated traffic flow to the destination; and
applying, by the intermediate network node, to the packet, the at least one network policy, wherein the at least one network policy is for reconfiguring at least one of gathering of the analytics by the intermediate network node or transporting, by the intermediate network node, the encapsulated traffic flow to the destination.

2. The method of claim 1, wherein the at least one network policy relates to gathering telemetry, and wherein the method further comprises:
providing, by the intermediate network node to a predictive monitoring service, at least a portion of the enriched metadata; and
obtaining, from the predictive monitoring service, a new network policy to be applied to the encapsulated traffic flow, wherein the new network policy is generated based on the portion of the enriched metadata.

3. The method of claim 1, wherein the enriched metadata includes a first security score for the source and a second security score for the destination, and wherein extracting the enriched metadata includes:
obtaining at least one of the first security score or the second security score, per packet flow or per packet microflow.

4. The method of claim 1, wherein the enriched metadata includes a tenant identifier that identifies a network tenant, and wherein applying the at least one network policy includes:
applying, by the intermediate network node, a tenant specific policy to the packet.

5. The method of claim 1, wherein the enriched metadata includes a location identifier, and wherein applying the at least one network policy includes:
applying, by the intermediate network node, a location specific policy to the packet.

6. The method of claim 1, wherein the enriched metadata includes a portion of a secure hash value computed at the edge network node, and wherein the method further comprises:
computing, by the intermediate network node, a local hash; and
comparing a part of the local hash to the portion of the secure hash value included in the enriched metadata to validate integrity of the appended service plane protocol header.

7. The method of claim 1, further comprising:
providing, to an external entity that is external to the intermediate network node, the enriched metadata, wherein the external entity performs at least one of machine learning and regression analysis of the enriched metadata and generates a predictive policy for the encapsulated traffic flow; and
obtaining, from the external entity, the predictive policy to be applied to the encapsulated traffic flow.

8. The method of claim 1, wherein the fields for the one or more attributes include an application identifier, location identifiers of a source physical location and a destination physical location, a destination group tag, a security score for one or more of the source of the packet or the destination of the packet, or a tenant identifier.

9. The method of claim 1, wherein applying, by the intermediate network node, to the packet, the at least one network policy includes one or more of:
generating a copy of the packet and providing the copy to a monitoring service for analysis; or
redirecting the packet to a filtering device that determines whether to drop the packet of the encapsulated traffic flow.

10. The method of claim 1, wherein determining the at least one network policy includes:
determining to apply a tenant specific policy based on user group related information included in the enriched metadata; and
determining to apply a security related policy based on user device related information included in the enriched metadata.

11. The method of claim 1, wherein the enriched metadata is encapsulated into a fixed position within a network service header and includes a source group tag and a destination group tag.

12. The method of claim 1, wherein the enriched metadata includes an application identifier and an application class, and wherein determining, by the intermediate network node, the at least one network policy includes:
determining, by the intermediate network node, the at least one network policy in a data plane by selecting a transport path, based on the application class, for transporting the encapsulated traffic flow to the destination.

13. An apparatus comprising:
a memory;
a network interface configured to enable network communications; and
a processor, wherein the processor is configured to perform operations comprising:
obtaining a packet of an encapsulated traffic flow that is transported in a software-defined wide area network (SD-WAN) or in a cloud network, the packet including a network virtualization tunneling header with an appended service plane protocol header and a payload;
extracting, from one or more pre-defined bit positions of the appended service plane protocol header, without the processor performing deep packet inspection, enriched metadata that includes fields for one or more attributes related to a source of the packet or a destination of the packet, wherein the enriched metadata was generated by an edge network node performing deep packet inspection of the packet and the enriched metadata was inserted by the edge network node in the one or more pre-defined bit positions in an overlay header between an Internet Protocol header and a group policy object header;

determining at least one network policy based on the enriched metadata, wherein the at least one network policy relates to at least one of gathering analytics or transporting the encapsulated traffic flow to the destination; and applying, to the packet, the at least one network policy, wherein the at least one network policy is for reconfiguring at least one of gathering of the analytics of the encapsulated traffic flow by the apparatus or transporting, by the apparatus, the encapsulated traffic flow to the destination.

14. The apparatus of claim 13, wherein the at least one network policy relates to gathering telemetry and the processor is further configured to:

provide, to a predictive monitoring service, at least a portion of the enriched metadata; and obtain, from the predictive monitoring service, a new network policy to be applied to the encapsulated traffic flow, wherein the new network policy is generated based on the portion of the enriched metadata.

15. The apparatus of claim 13, wherein the enriched metadata includes a first security score for the source and a second security score for the destination, and wherein the processor is configured to extract the enriched metadata by:

obtaining at least one of the first security score or the second security score, per packet flow or per packet microflow.

16. The apparatus of claim 13, wherein the enriched metadata includes a tenant identifier that identifies a network tenant, and wherein the processor is configured to apply the at least one network policy by:

applying a tenant specific policy to the packet.

17. The apparatus of claim 13, wherein the enriched metadata includes a portion of a secure hash value computed at the edge network node and the processor is further configured to:

compute a local hash; and compare a part of the local hash to the portion of the secure hash value included in the enriched metadata to validate integrity of the appended service plane protocol header.

18. One or more non-transitory computer readable storage media encoded with instructions that, when executed by a processor, cause the processor to execute a method comprising:

obtaining a packet of an encapsulated traffic flow that is transported in a software-defined wide area network (SD-WAN) or in a cloud network, the packet including a network virtualization tunneling header with an appended service plane protocol header and a payload;

extracting, from one or more pre-defined bit positions of the appended service plane protocol header, without the processor performing deep packet inspection, enriched metadata that includes fields for one or more attributes related to a source of the packet or a destination of the packet, wherein the enriched metadata was generated by an edge network node performing deep packet inspection of the packet and the enriched metadata was inserted by the edge network node in the one or more pre-defined bit positions in an overlay header between an Internet Protocol header and a group policy object header;

determining at least one network policy based on the enriched metadata, wherein the at least one network policy relates to at least one of gathering analytics or transporting the encapsulated traffic flow to the destination; and applying to the packet the at least one network policy, wherein the at least one network policy is for reconfiguring at least one of gathering of the analytics by an intermediate network node or transporting, by the intermediate network node, the encapsulated traffic flow to the destination.

19. The one or more non-transitory computer readable storage media of claim 18, wherein the at least one network policy relates to gathering telemetry, and wherein the method further comprises:

providing, to a predictive monitoring service, at least a portion of the enriched metadata; and obtaining, from the predictive monitoring service, a new network policy to be applied to the encapsulated traffic flow, wherein the new network policy is generated based on the portion of the enriched metadata.

20. The one or more non-transitory computer readable storage media of claim 18, wherein the enriched metadata includes a first security score for the source and a second security score for the destination, and wherein extracting the enriched metadata includes:

obtaining at least one of the first security score or the second security score, per packet flow or per packet microflow.

* * * * *